Figure 1:
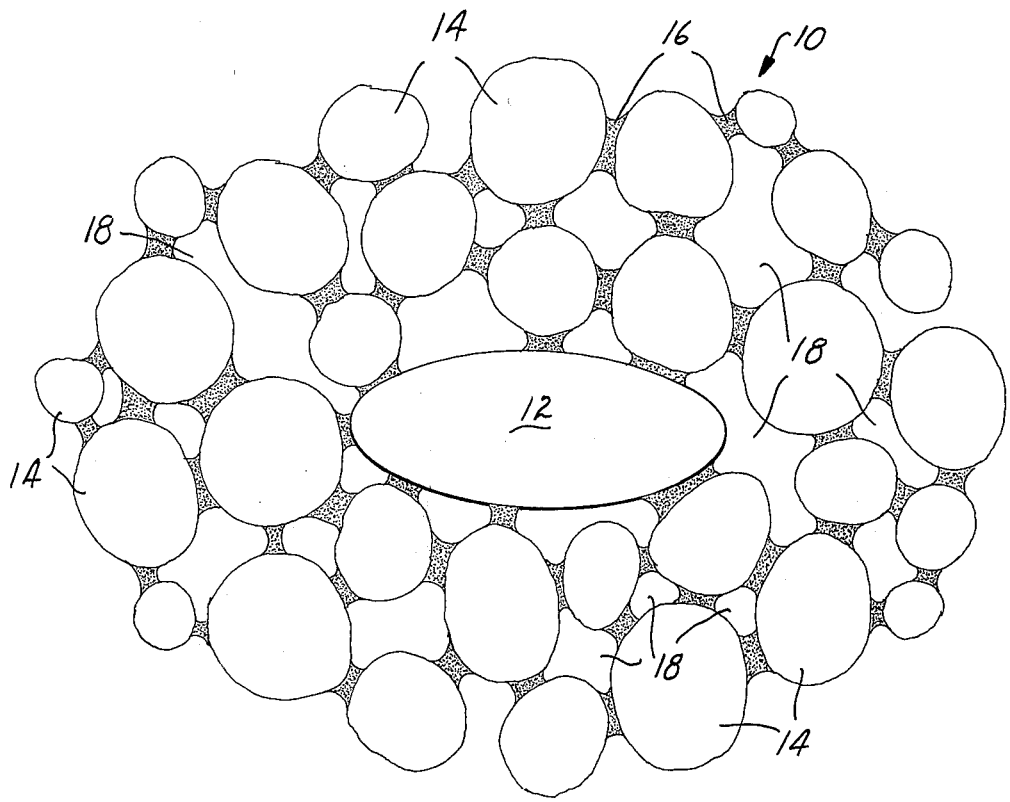

United States Patent [19]
Loperfido

[11] 3,905,152
[45] Sept. 16, 1975

[54] COATED SEEDS
[75] Inventor: John C. Loperfido, St. Paul, Minn.
[73] Assignee: Minnesota Mining and Manufacturing Company, St. Paul, Minn.
[22] Filed: July 2, 1974
[21] Appl. No.: 485,254

[52] U.S. Cl.................................. 47/57.6; 117/3
[51] Int. Cl............................................. A01c 1/06
[58] Field of Search......... 47/57.6, DIG. 9, 1; 117/3

[56] References Cited
UNITED STATES PATENTS
| | | | |
|---|---|---|---|
| 2,579,732 | 12/1951 | Funsten et al. | 47/57.6 |
| 2,651,883 | 9/1953 | Hedrick et al. | 47/57.6 |
| 2,656,649 | 10/1953 | Ostier | 47/57.6 |
| 3,460,492 | 8/1969 | Dickinson et al. | 47/57.6 X |
| 3,616,573 | 11/1971 | Clifford | 47/57.6 |

*Primary Examiner*—Robert E. Bagwill
*Attorney, Agent, or Firm*—Alexander, Sell, Steldt & DeLaHunt

[57] ABSTRACT

Coated seeds are disclosed which comprise seeds having a coating thereon comprising non-porous, hydrophobic, non-phytotoxic particles which are adhered to each other and to the seed by means of a hydrophilic binder in such a manner that the coating is highly porous and provides facile gas and water exchange between the seed and its environment. The coated seeds can be planted with mechanized precision planting equipment.

25 Claims, 2 Drawing Figures

COATED SEEDS

BACKGROUND OF THE INVENTION

The present invention relates to the art of coating seeds. More specifically, the invention relates to the art of coating small plant seeds to increase their overall dimensions so that they may be efficiently planted with mechanized equipment.

It has long been recognized that the cost of large-scale commercial planting operations can be greatly reduced by the use of mechanized "precision planting." "Precision planting may be defined as the continuous, exact placement of one or more seeds in the soil at a predetermined depth and spacing, with uniform coverage, and at reasonable planting speeds." (Transactions of the ASAE, Vol. 10, No. 5, 1967).

Precision planting requires the singulation of seeds prior to their placement in the soil. This presents little problem with seeds which are large and relatively uniform in shape such as corn and the like. However, many vegetable seeds such as lettuce, sugar beet and celery seeds are small and/or irregularly shaped. Currently available mechanical planters are unable to efficiently singulate these small seeds during the planting operation. Consequently, an excess of seed has to be planted and the crop must be subsequently thinned back to an optimum population. In most cases, this thinning process must be accomplished by expensive hand labor and often results in thinning shock or root damage to remaining plants.

Precision planting of seeds provides for a substantial saving of seed; reduced thinning efforts; fewer post-planting field operations; more uniformity of crop maturation; more efficient harvesting operations; and controlled plant populations for maximum yields.

Many attempts have been made to solve the problem of adapting small seeds to precision planting. Several methods have been described for coating the seeds to increase their dimensions. For example, U.S. Pat. No. 2,502,809 describes a method of coating seeds with dust particles of flyash, feldspar or acid-activated earth. These particles are held together and to the seed with a methyl cellulose binder.

U.S. Pat. No. 3,561,159 describes the formation of a seed capsule of expanded vermiculite and a liquid binder. The capsule is formed by compression of the vermiculite around the seed which rests in a small cavity. A similar tablet, termed an "environmental seed cell," is disclosed in U.S. Pat. No. 3,690,034. A cushioning layer of extremely small particle size is provided between the seed and the outer layer or larger particles, comprising vermiculite and a non-laminar substance such as peat moss or other cellulosic material. A suitable adhesive binder is used to hold the particles together.

U.S. Pat. No. 3,703,404 describes a seed coating having two distinct layers: (1) a nuclear coat of finely ground porous particles, e.g., vermiculite, and (2) an overcoat of slightly larger porous particles held together by a mixture of polyvinyl acetate and polyvinyl alcohol. The largest particles used in the coating do not exceed 100 microns.

The above patents, while describing techniques generally useful in providing coated seeds which are large enough to be precision planted, do not describe coated seeds having porosity of the type or in an amount necessary to obtain proper germination and emergence of the seeds and seedlings. For example, some of the prior art seed coatings utilize particulate material of extremely small size which can become closely packed around the seed. Other coatings contain binders in large amounts or of a type which tends to fill up the spaces between the particles. Still other coatings utilize porous particulate materials, such as vermiculite, which tend to absorb moisture from the soil and thereby expand to reduce the size of the spaces between the particles.

In addition to seed coatings which are primarily designed to increase the overall size of seeds, other seed coatings are known in the art which serve other useful purposes. For example, U.S. Pat. No. 3,698,133 describes a multiple coating for seeds which serves to delay germination of the seed until environmental conditions are optimum. This coating comprises (1) an inner porous coating which is permeable to water comprising a water insoluble particulate material such as sandy loam, powdered talc, ground limestone, powdered silica, powdered vermiculite, etc., which is dispersed throughout a water-soluble binder such as sugar, alginates, natural glue, mucilage or molasses; and (2) an outer coating which is a film of non-elastomeric material such as a polymer. Such particulate materials used in the inner coating, however, are hydrophilic. Also, such a coating does not exhibit porosity of the type or in an amount necessary in order to obtain optimum germination and emergence of the seeds.

U.S. Pat. No. 2,967,376 describes a method of treating seeds by applying to them a thin multi-layered coating. The purpose of the coating is to promote seed growth, and no appreciable increase in seed size is provided. The first layer of the coating comprises a pesticide, the second layer a humectant and the third layer a conditioning material (i.e., a flow agent) to promote flowability.

Previous attempts to coat small seeds for the purpose of adapting them for use in precision planters have been largely unsuccessful. The main reason for their failure has been due to poor germination of the coated seeds. Although known coated seeds can be precision planted, an unacceptable number of these seeds fail to emerge from their coatings. In addition to failure of emergence, delayed emergence is also a serious problem encountered with coated seeds of the prior art.

SUMMARY OF THE INVENTION

The problem of poor germination and subsequent emergence associated with conventional seed coatings is alleviated by means of the present invention which provides coated seeds wherein the coating is highly porous so as to permit free exchange of gases and water between the seed and its environment. Accordingly, the present invention provides a coated seed comprising a seed bearing a coating which comprises a plurality of non-porous, hydrophobic, non-phytotoxic particles which are adhered to each other and to the seed by means of a hydrophilic binder which is present in an amount not exceeding 10 percent by weight of said coating. When generally spherical or spheroidal or slightly irregularly shaped particles are used to form the coating, the particles will generally range in size from 50 to 900 microns in diameter. If fibrous particles are used to form the coating, their longest dimension may be up to 2,500 microns.

It is highly preferred that the coated seeds of the invention have a porosity characteristic which includes at least 15 percent of its total apparent volume as surface accessible air spaces or pores with at least 12 percent of said pores being in a size range of 2 to 100 microns in diameter.

The nature of the seed coating is such that microscopic passageways are present therein to facilitate the free exchange of gases and water between the seed and its soil environment. Seeds treated according to the present invention exhibit germination characteristics superior to known seed pellets, and indeed, generally approximate the germination characteristics of "naked," i.e., untreated, seeds.

Coated seeds of the present invention are in a size range which allows them to be efficiently planted with a mechanical planter. The coating does not interfere with the natural respiration of the seed and does not inhibit its germination. Furthermore, the coating loses its mechanical integrity when wetted, thereby minimizing inhibition of emergence. Coated seeds of the invention can be stored for long periods of time under normal storage conditions without adverse effects. In addition, the seed coating of the present invention provides a convenient vehicle for incorporating additives with the seed, such as growth stimulants, fertilizers, etc. which are known to impart desirable effects when placed in close proximity to the germinating seed.

The coated seeds of the invention are further illustrated by reference to FIG. 1 of the accompanying drawings.

FIG. 1 is a cross sectional view of a coated seed 10 which comprises a seed 12 surrounded by non-porous, hydrophobic, non-phytotoxic particles 14 which are adhered to each other and to the seed by means of a hydrophilic binder 16 in such a manner that air spaces 18 are present and said air spaces are connected so as to form passageways throughout the coating. These passageways permit the free flow of gases and water to and from the seed.

Figure 2:
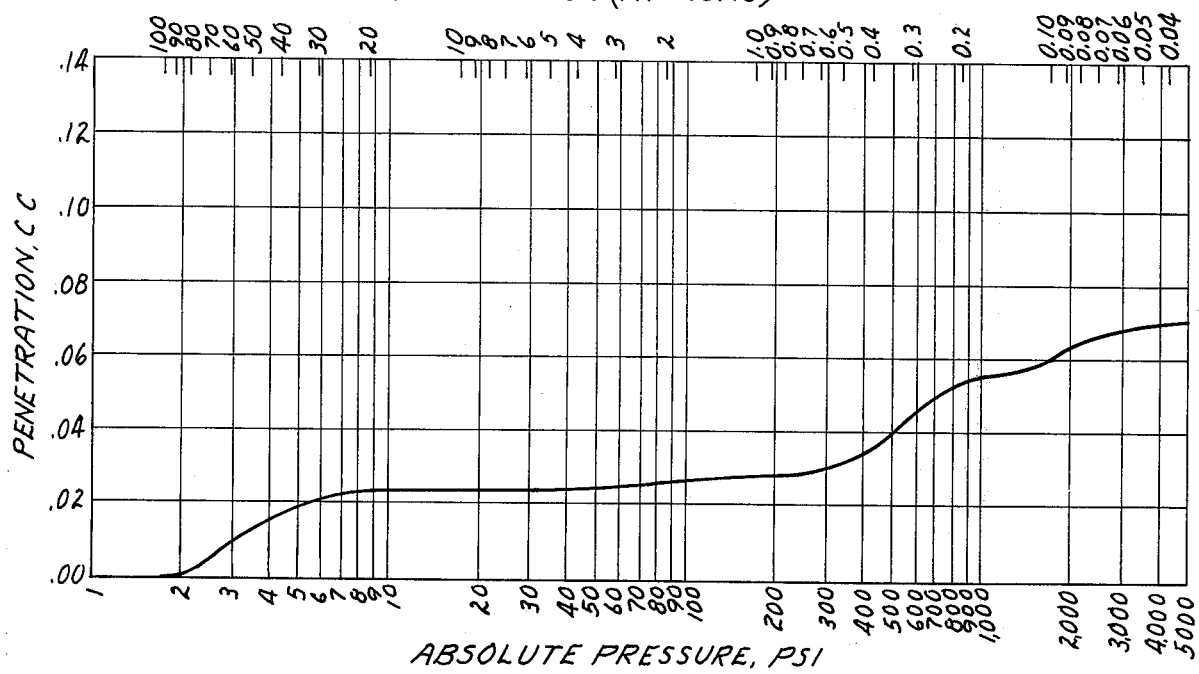

FIG. 2 illustrates a pore size distribution curve.

The term "non-porous" as used herein to describe the particles comprising the seed coating is intended to describe solid materials which are substantially free of pores. A non-porous substance does not absorb any appreciable amount of moisture from the surrounding environment and thereby increase in size or mass. It is essential that the particles used according to the present method be non-porous, because porous particles tend to absorb moisture from the soil and swell, thereby diminishing the size of the air spaces which are present in the coating.

The terms "hydrophilic" and "hydrophobic" as used herein simply relate to substances which are wetted by water and substances which are not wetted by water, respectively. The hydrophilicity or hydrophobicity of substances which can be formed into films is easily determined by measuring the contact angle which is formed between the film and a drop of water. Substances, in film form, which produce a contact angle with water which is greater than 90° may be considered hydrophobic and those substances producing a contact angle with water which is less than 90° may be considered hydrophilic.

The use of hydrophobic particles together with a hydrophilic binder is essential to the practice of the present invention. When the hydrophilic binder is applied to the hydrophobic particles, the binder does not uniformly coat the particles but tends to bead and collect in the smallest possible surface area on the particle. Due to this phenomenon, the hydrophilic binder tends to collect primarily at the contact points between the hydrophobic particles. This accounts for the highly porous nature of the seed coating.

Types of non-porous, hydrophobic, non-phytotoxic particulate material which may be used to form the coated seeds of the invention include polyolefins, polyhalo-olefins, poly styrenes, vinyl and vinylidene polymers, polydienes, polyanhydrides, polycarbonates, polyesters, polyethers, polysiloxanes, cellulose derivatives, waxes, rubbers, silanized materials, fluoropolymers and fluorocarbon-treated materials.

Preferred particulate materials for use in the seed coatings are silanized glass bubbles and glass beads, polyethylene, polyester and polypropylene particles. It is especially preferred to use particles of polypropylene.

To provide a maximum amount of air space in the coated seeds, it is preferred that the non-porous, hydrophobic, non-phytotoxic particles be spherical or spheroidal in shape, although irregular-shaped or fiber-shaped particles may also be used, if desired. However, when particle shapes are varied progressively from spherical to fiber-shaped, the porosity of the resulting coated seed is increasingly diminished.

The size of the particles used to form the seed coating will vary according to the size of the seed to be coated. It the coating process is accomplished by a mechanical process of tumbling the seeds and particulate material together in the presence of the binder, it is preferred that the particles be smaller in size than the seed to be coated. This will insure proper buildup of the coating around the seed nucleus.

To coat common vegetable seeds such as lettuce, sugar beet, radish, onion, celery, cucumber, carrot, spinach, tomato, cabbage, and the like, which seeds generally range in size from 1 to 10 mm. at their largest dimension, spherical, spheroidal or irregularly-shaped particles in the size range of 50 to 900 microns may be used. It is preferred to use spheroidal particles in the size range of 150 to 750 microns. If fiber-shaped particles are used, they may be up to 2500 microns at their longest dimension. There is no need to size the particles prior to use to insure uniformity since it is not undesirable to have particles of varying sizes within a particular coating.

Many flower seeds such as petunia seeds are extremely small and may require coatings which comprise smaller particles than those generally used to coat vegetable seeds. When extremely small flower seeds are coated, it is also possible to use smaller particles to form the part of the coating immediately adjacent to the seeds and then complete the coating with larger particles.

Binders which may be used according to the present invention to adhere the particles to each other and to the seed include any hydrophilic material which is not harmful to the seeds and, in solution, supplies enough tackiness to insure proper buildup of the seed coating around the seed during conventional coating processes. Such hydrophilic binders are well known in the art and include materials such as solutions of animal hide glue, methyl cellulose, polyvinyl alcohol, dextrins, alginates, sugars, molasses, polyvinyl pyrrolidone, polyvinyl acetate, methyl cellulose, hydroxypropyl cellulose, and the like. A presently preferred binder for use in forming the coated seeds of the present invention is hide glue.

Due to the hydrophilic nature of the binder, it will be readily dissolved by soil moisture. Dissolution of the binder destroys the mechanical integrity of the coating, thereby allowing emergence of the radicle and cotyledon through the coating.

The amount of binder used should be the smallest amount possible consistent with the mechanical integrity necessary for shipping, handling and planting the coated seed. Excess binder will tend to collect in the air spaces between the particles and thereby reduce the porosity characteristic of the coating. The amount of a particular binder which is used to form a seed coating generally depends upon its tackiness. It has also been found that more binder is required when non-spheroidal particles or particles below the preferred size range are used. In any event, the amount of binder used to form the seed coating should not exceed 10 percent by weight of the coating (i.e., the weight of the particulate material and the binder). When spherical or spheroidal particles are used to coat common vegetable seeds, the preferred concentration of binder is between 3 and 5 percent by weight of the coating.

The coatings are built up on the seeds by conventional methods such as by pan-coating, as used in the pharmaceutical industry, or by spraying the binder onto a mixture of the seed and particulate material while rotating in a conventional mixer.

Coatings are generally built up to a thickness of up to approximately 3 mm. Thicker coatings offer little apparent benefit for the purpose of precision planting.

The "porosity characteristic" of the coated seeds of the invention refers to the total amount of air space in the coating which is accessible from the surface and also to the size of the surface accessible pores. The first component of the porosity characteristic, expressed as a percent of the apparent volume of the coated seed (determined by volume of mercury displacement at atmospheric pressure), is termed "total porosity;" and the second component of the porosity characteristic refers to "pore size distribution," and is expressed as percent of total porosity within a particular pore-size range. The porosity characteristic of any coated seed is readily determined by means of a mercury porosimeter. This instrument and its method of use are described by Winslow and Shapiro in ASTM Bulletin No. 236, February, 1959.

Porosity characteristics of the coated seeds of the present invention and of several coated seeds of the prior art were measured using the general method described in ASTM Standard No. D-2873-70.

This method describes a standard procedure for measuring interior pore volume and the size of pore diameters. The measurements are made by forcing mercury under increasing pressure through a graduated penetrometer into the open pores of the coated seed samples. The volume of mercury forced into the pores is determined by the change in the volume of mercury in the calibrated penetrometer stem.

The size of the pores in the coated seeds is indirectly related to the pressure required for mercury penetration to occur.

The first component of the porosity characteristic of the coated seeds, i.e., total porosity, is determined by measuring two parameters: (1) the apparent volume of the coated seeds, measured by the amount of mercury displaced by the coated seeds at atmospheric pressure; and (2) the total pore volume of the coated seeds measured by the total amount of mercury penetration which results from the application of pressure increments up to 5000 psi. Total porosity is expressed as a percent (total pore volume/apparent volume × 100).

Total porosity as measured by a standard mercury porosimeter includes only those pores having diameters between 0.035 and 100 microns. In addition, only pores which are accessible from the surface of the coated seeds are included in the measurement of total porosity.

The second component of the porosity characteristic of the coated seeds, i.e., pore size distribution, is determined by calculating the percent of the total porosity which is attributed to pores having diameters between 2 and 100 microns. This is easily done by measuring the volume of mercury taken up by the coating from the application of absolute pressure increments between approximately 1.75 and 88.0 psi. as described in detail in Example 2. Pore size distribution within the desired range is expressed as a percent (total volume of pores which are 2 to 100 microns in diameter/total pore volume × 100).

It is highly preferred that the total porosity determined by subjecting coated seeds to the aforementioned analysis be at least 15 percent with at least 12 percent of total pore volume being due to the presence of pores in the size range of 2 to 100 microns in diameter. It is particularly preferred that the total porosity be at least 25 percent, with at least 25 percent of total pore volume being due to the presence of pores having a diameter between 2 and 100 microns.

In treating seeds (including pre-germinated seeds) according to the present invention, it is possible, and sometimes quite desirable, to include in the coating conventional germination enhancing materials, biocides, fertilizers, plant growth control substances, inoculants such as bacterial cultures, and other similar materials. These materials may be applied directly to the seed before the coating process begins; they may be distributed throughout the coating by application to the particulate material or by incorporation into the binder solution, or they may be absorbed onto the surface of the seed pellet after the coating process is completed.

A particularly desirable combination of materials which has been found to produce synergistic effects in the coatings of this invention is described in assignee's copending application Ser. No. 485,251 filed July 2, 1974, now abandoned, incorporated herein by reference. This combination of materials comprises a mixture of potassium gibberellate $A_3$ and L-ascorbic acid in a weight ratio ranging generally from 1:4 to 3:1, gibberellate to L-ascorbic acid respectfully.

Additives incorporated into the seed coating of the invention should not appreciably change the essential characteristics of the particulate material or the binder, and they should not be incorporated into the seed coating in such a manner as to appreciably change its porosity characteristic.

The invention is further illustrated by the following illustrative and non-limiting examples.

EXAMPLE 1

Approximately 20 g. of lettuce seeds tumbling in a balling pan, (11-inch diameter, 3-inch depth) at a rate of 10 to 30 rpm were wetted via spray application of 7 ml. of a 5 percent aqueous hide glue solution (Grade A from Peter Cooper Corp.). Approximately 5 g. of polypropylene beads in a size range of 150 to 750 microns (Hercules, Profax 6301) sufficient to utilize the binding capacity of the applied hide glue solution was sifted onto the tumbling seeds and the mixture was allowed to equilibrate to uniform size. The partially coated seeds were resprayed with 7 ml. of the 5 percent binder solution, treated with approximately 5 g. of polypropylene beads, and reequilibrated to a now larger uniform size. This process was repeated until the seed pellets had built up to at least 2.85 mm. at their narrowest diameter. The complete pelletizing operation required approximately one hour and generated a product with a seed-to-coating weight ratio of 1:4.8. The coated seeds were air dried over night and sieved to uniformity (between 2.85 and 3.35 mm. at their narrowest dimension).

When these coated seeds are planted and subsequently wetted by the moisture of the soil, dissolution of the hide glue within the coating generates a solution having a pH between 6.0 and 7.0. This pH is optimum for germinating seeds.

Lettuce seeds (Calmar Variety, Mosaic-tested, from Ferry Morse Co.), coated according to the above method, were field-tested in the Salinas Valley of California along with uncoated lettuce seeds from the same lot. The coated seeds were precision planted at a depth of ¾ inch, and the uncoated seeds were hand planted at the same depth. The planting was done in the month of February, and the soil temperature was between 5° and 20°C at the seed depth. The pH of the soil was about 7.0, and its composition was approximately 57 percent sand, 28 percent silt and 15 percent clay. The soil was kept moist by intermittent sprinkler irrigation between planting and emergence of the seedlings. Germination and emergence results are summarized in the following Table I.

Table I

Field Performance of Coated v. Uncoated Seeds

| Percent Germination (± 5%) | | | Percent Emergence (± 5%) | | |
|---|---|---|---|---|---|
| Time (Hours) | Uncoated | Coated | Time (Hours) | Uncoated | Coated |
| 24 | 0 | 6 | 120 | 0 | 0 |
| 36 | 8 | 37 | 132 | 3 | 18 |
| 48 | 83 | 69 | 144 | 13 | 39 |
| 60 | 92 | 88 | 156 | 30 | 62 |
| 72 | 95 | 95 | 168 | 79 | 78 |
| 84 | 100 | 100 | 180 | 90 | 89 |
| | | | 192 | 96 | 94 |
| | | | 204 | 98 | 97 |

EXAMPLE 2

The porosity characteristic of the coated seeds of Example 1 was determined using an Aminco-Winslow Porosimeter (No. 5-7107 from American Instrument Co., Inc, Silver Springs, Md.). The determination was made according to the operating instructions provided with the instrument (Instruction No. 597, August, 1960).

Ten of the coated seeds were selected and placed in a penetrometer having a bulb volume of approximately 1.7 ml. By subtracting the weight of the empty penetrometer (59.4764 g.) from the weight of the penetrometer containing the coated seeds (59.5912 g.), the coated seeds were found to have a weight of 0.1148 g.

The penetrometer was then loaded into the filling device. The vacuum valve was opened and the vacuum pump was turned on to evacuate air from the penetrometer. The vacuum pump was allowed to pump down to a pressure of 30 microns of Hg as measured by the vacuum gage. The penetrometer was then slowly filled with mercury. The 3-way stop cock (connecting the mercury tube, penetrometer and atmosphere tube) was carefully opened to atmosphere until the 0 to 15 psi gage read 6.3, and then closed. At this gage reading the penetrometer stem had a reading of 0.000 cc.

With the penetrometer in this position, pore sizes of 100 to 17 microns in diameters were measured by step wise increments in pressure between 6.3 and 14 psi (atmospheric pressure). This was done by carefully opening the 3-way stopcock to atmosphere and then closing it when the desired 0 to 15 psi gage reading was reached. At each gage reading selected (even numbers between 7 and 14), the gage reading was recorded along with the penetrometer stem reading at that point.

When atmospheric pressure was reached, the penetrometer was removed from the filling device and weighed. The apparent volume of the seeds was determined by first subtracting the weight of the penetrometer containing the sample and filled with mercury (84.3661 g.) from the sum of the weight of the penetrometer filled only with mercury, (86.9000 g.) and the weight of the sample (0.1148 g.). The value thus obtained was divided by the specific density of mercury (13.54) to give the apparent volume of the coated seeds at atmospheric pressure (0.196 cc.).

The penetrometer was then placed in the pressure vessel and pressure was applied in increments up to 5000 psi. Pore sizes ranging downward from 17 to 0.035 microns were determined with the penetrometer in this position. At each selected pressure increment between 20 and 5000 psi, the penetrometer stem reading (in cc.'s) was recorded along with the 0 to 5,000 psi pressure gage reading. To calculate absolute pressure for the gage readings, atmospheric pressure was added to the gate pressure reading and the mercury head pressure was then subtracted from this value. The head pressure of mercury corresponding to the appropriate penetrometer stem reading was obtained from a standard chart. (See, for example, ASTM Standard D 2873-70).

The measurements obtained from the above procedure are shown in the following Table II.

Table II

Porosity Determinations
Pressure Data

| Hg Head Pressure (p.s.i.) | 0 to 15 Gage Reading (p.s.i.) | Pressure Gage Reading (p.s.i.) | Total Absolute Pressure (p.s.i.) | Penetrometer Stem Readings (cc.) |
|---|---|---|---|---|
| 4.56 | 6.3 | | 1.74 | 0.000 |
| 4.52 | 7 | | 2.48 | .003 |
| 4.40 | 8 | | 3.60 | .012 |
| 4.32 | 9 | | 4.68 | .018 |
| 4.29 | 10 | | 5.71 | .020 |
| 4.26 | 11 | | 6.74 | .022 |
| 4.25 | 14 | | 9.75 | .023 |
| 4.25 | 14 | | 9.75 | .023 |
| 4.24 | | 20 | 30 | .024 |
| 4.21 | | 60 | 70 | .026 |
| 4.20 | | 100 | 110 | .027 |
| 4.17 | | 200 | 210 | .029 |
| 4.13 | | 300 | 310 | .032 |
| 4.06 | | 400 | 410 | .037 |
| 3.99 | | 500 | 510 | .042 |
| 3.93 | | 600 | 610 | .047 |

Table II-Continued

Porosity Determinations
Pressure Data

| Hg Head Pressure (p.s.i.) | 0 to 15 Gage Reading (p.s.i.) | Pressure Gage Reading (p.s.i.) | Total Absolute Pressure (p.s.i.) | Penetrometer Stem Readings (cc.) |
|---|---|---|---|---|
| 3.89 | | 700 | 710 | .050 |
| 3.86 | | 800 | 810 | .052 |
| 3.83 | | 900 | 910 | .054 |
| 3.80 | | 1200 | 1210 | .056 |
| 3.70 | | 2000 | 2010 | .064 |
| 3.64 | | 3200 | 3210 | .068 |
| 3.63 | | 4000 | 4010 | .069 |
| 3.62 | | 5000 | 5010 | .070 |

The penetrometer stem readings in cc's versus the absolute pressure were then plotted on four phase semi-logarithmic paper. This curve obtained represents a profile of the apparent pore size distribution of the coated seeds. The curve is shown in FIG. 2 of the accompanying drawings.

Summary of the porosity data obtained for the coated seeds of this example is as follows:

| | | | |
|---|---|---|---|
| 1. | Wt. of penetrometer with sample | 59.5912 | gm |
| 2. | Wt. of penetrometer empty | 59.4764 | gm |
| 3. | Wt. of sample (1−2) | 0.1148 | gm |
| 4. | Wt. of penetrometer with mercury | 86.9000 | gm |
| 5. | Wt. of penetrometer with sample and mercury | 84.3661 | gm |
| 6. | Displacement of apparent volume of sample (3+4−5)/13.54 | .196 | cc |
| *7. | Total pore volume of sample | .070 | cc |
| 8. | Real volume of sample (6−7) | .126 | cc |
| **9. | Total porosity of sample (7/6)100 | 35.7 | % |
| 10. | Amount of total pore volume of sample due to pore sizes between 2 and 100 microns | .027 | cc |
| 11. | Porosity of sample due to pore sizes between 2 and 100 microns (10/7)100 | 38.0 | % |
| 12. | Amount of pore volume of sample due to pore sizes between 0.035 and 2 microns | .048 | cc |
| 13. | Porosity of sample due to pore sizes between 0.035 and 2 microns (12/7)100 | 62.0 | % |

*Penetrometer stem reading at 5000 psi.
**Porosity due to surface accessible pores of diameter greater than 0.035 microns but less than 100 microns.

EXAMPLES 3–18

Following the method described in Example 1 other seeds were coated and the porosity characteristics of the coated seeds were determined according to Example 2. The coatings on these seeds were in the range of 1 to 3 millimeters in thickness. The coated seeds are described in the following Table III.

Table III

| Example Number | Seed (Variety) | Particulate Material* | Approximate Dimensions of Coated Seed(mm) | Binder** | Amount of Binder as % of Coating | Total Porosity (%) | Pore Size Distribution (% of Total Porosity) 2–100μ | Pore Size Distribution (% of Total Porosity) .035–2μ | Emergence Relative To Naked Seed (%) |
|---|---|---|---|---|---|---|---|---|---|
| 3 | Sugar Beet (Mono-Germ Hybid A-1) | Polypropylene | 4.8 | Hide Glue | 3.9 | 32.5 | 20.0 | 80.0 | 98 |
| 4 | Radish (Cherry Belle) | Polypropylene | 6.4 × 4.8 | Hide Glue | 4.2 | 34.0 | 27.9 | 72.1 | 98 |
| 5 | Onion (Perfecto Blanco) | Polypropylene | 4.8 × 3.2 | Hide Glue | 3.3 | 32.4 | 38.9 | 61.1 | 79 |
| 6 | Celery (Golden Self-Blanching) | Polypropylene | 2.4 | Hide Glue | 2.1 | 33.7 | 60.7 | 39.3 | 400 |
| 7 | Cucumber (Marketer) | Polypropylene | 10.5 × 6.4 × 3.4 | Hide Glue | 3.3 | 29.5 | 23.6 | 76.4 | 100 |
| 8 | Carrot (Nantes Coreless) | Polypropylene | 4.0 × 2.4 | Hide Glue | 4.4 | 28.6 | 45.4 | 54.6 | 98 |
| 9 | Spinach (Bloomsdale Long Standing Dark Green) | Polypropylene | 4.8 | Hide Glue | 4.1 | 29.3 | 38.3 | 51.7 | 100 |
| 10 | Tomato (Rutgers) | Polypropylene | 4.8 × 3.2 | Hide Glue | 2.4 | 34.2 | 14.1 | 85.9 | 100 |
| 11 | Cabbage (Ballhead Short Stem) | Polypropylene | 3.2 | Hide Glue | 3.4 | 27.9 | 42.8 | 57.2 | 100 |
| 12 | Sugar Beet (Mono-Germ Hybid A-1) | Polypropylene | 4.8 | Polyvinyl Alcohol | 1.1 | 36.1 | 65.6 | 34.4 | 98 |
| 13 | Sugar Beet (Mono-Germ Hybid A-1) | Polypropylene | 4.8 | Klucel | 1.0 | 33.8 | 63.6 | 36.4 | 98 |
| 14 | Lettuce (Calmar) | Polyester | 6.4 × 3.2 | Hide Glue | 4.0 | 27.5 | 43.3 | 56.7 | 94 |
| 15 | Lettuce (Calmar) | Polyethylene | 6.4 × 3.2 | Hide Glue | 5.4 | 40.0 | 41.3 | 58.7 | 96 |
| 16 | Lettuce (Calmar) | Polypropylene | 6.4 × 3.2 | Hide Glue | 3.3 | 33.2 | 29.0 | 71.0 | 100 |
| 17 | Lettuce (Calmar) | Polypropylene | 6.4 × 3.2 | Hide Glue | 1.7 | 34.6 | 26.6 | 73.4 | 100 |
| 18 | Lettuce (Calmar) | Polypropylene | 6.4 × 3.2 | Hide Glue | 4.0 | 37.2 | 34.6 | 65.4 | 100 |

*Examples 3 – 13--Spheroidal polypropylene particles in a size range of 150 to 750 microns (Hercules Profax 6301).
Example 14--Irregular-shaped polyester particles having a broadest dimension of about 710 microns.
Example 15--Spheroidal polyethylene particles in a size range of 50 to 250 microns, (Allied (J. T. 1221).
Example 16--Polypropylene particles, as in examples 3 – 13, in a size range of 300 to 750 microns.
Example 17--Polypropylene particles, as in examples 3 – 13, in a size range of 150 to 300 microns.
Example 18--Polypropylene particles, as in examples 3 – 13, of uniform size (approximately 150 microns).
**Examples 3 – 11, 14 – 18--Grade A hide glue from Peter Cooper Co.
Example 12--Polyvinyl alcohol, 99 to 100 percent hydrolyzed, 4 percent aqueous solution having a viscosity of 55 to 65 CP at 20°C (J.T. Baker Chemical Co.).
Example 13--Klucel (hydroxypropyl cellulose), Type GF from Hercules, Inc.

EXAMPLE 19

For purposes of comparison, several commercially-available coated seeds were tested to determine their porosity characteristics. Prior art coated seeds which were analyzed were generally found to have either a significantly lower total porosity or a significantly lower percentage of pores in the size range of 2 to 100 microns than the coated seeds of the present invention.

The results are summarized in the following Table IV.

percent. Emergence rates were determined for seeds of each batch.

The data obtained are summarized in the following Table V. These data indicate no significant difference in emergence rates between the naked seeds and the seeds coated with the silanized (hydrophobic) glass bubbles. However, the seeds coated with the silanized (hydrophilic) glass particles emerged approximately one day later than the seeds coated with the silanized glass particles.

Table IV

Porosity Characteristics of Known Coated Seed

| Seed | Commercial Designation | Coating Particles | Total Porosity (%) | Pore Size Distribution % of Total Porosity | |
|---|---|---|---|---|---|
| | | | | 2–100μ | .035–2μ |
| Lettuce | Moran-Minicoat | Diatomaceous Earth | 60.8 | 10.6 | 89.4 |
| Lettuce | Asgrow-Lite-coat | Vermiculite | 56.1 | 14.4 | 85.6 |
| Lettuce | Germain-Minimum Coated Filcoat Processed Lettuce Seeds | Clay | 5.6 | 32.5 | 67.5 |
| Lettuce | Royal Sleus-Split Coat | Clay | 29.6 | 1.9 | 98.1 |
| Sugar Beet | Germain-Minimum Coated Filcoat Processed Sugar Beet Seeds | Clay | 9.5 | 25.0 | 75.0 |

EXAMPLE 20

This example illustrates the necessity of using hydrophobic particles to form the seed coatings of the present invention in order to avoid delayed emergence of the seedlings.

Four batches of coated seeds were prepared according to the method of Example 1. In each batch, sugar beet seeds (Great Western Mono-Hy No. 1) were coated, and a hide glue binder was used. The particulate material was varied in each batch.

Glass bubbles in a size range of 30 to 170 microns were used to coat sugar beet seeds of one batch, and glass beads in a size range of 175 to 620 microns were used to coat seeds of a second batch. Two more batches of coated seeds were prepared using similar glass bubbles and glass beads except that the particles were first rendered hydrophobic by treatment with a silanizing agent. The glass bubbles and glass beads were treated by slurrying in a 1 percent aqueous solution of the silanizing agent (Dow Corning Z-6020 Silane), followed by filtering, washing with water and tumble drying. The silanized glass particles were then used to coat the sugar beet seeds. All four batches had porosity characteristics within the limits preferred for optimum performance, as specified herein.

Fifty coated seeds from each batch along with an equivalent number of naked beet seeds, were planted in soil having a moisture content of approximately 15

Table V

Performance of Hydrophobic versus Hydrophilic Particulate Coating Material

| Coating Materials | Amount of Binder (% of Coating) | Approximate Size of Coated Seed (mm) | % Emergence | | | | |
|---|---|---|---|---|---|---|---|
| Naked | — | — | 90 | 100 | | | |
| Silanized Glass Bubbles | 6.2 | 3.6 | 94 | 98 | | | |
| Unsilanized Glass Bubbles | 7.5 | 3.6 | 20 | 94 | 98 | | |
| Silanized Glass Beads | 1.4 | 3.6 | 78 | 80 | 88 | 92 | |
| Unsilanized Glass Beads | 1.0 | 3.6 | 12 | 68 | 80 | 90 | 96 |
| | | | 4 | 5 | 6 | 7 | 8 |
| | | | Time (Days) | | | | |

EXAMPLE 21

Incorporation of Additives Within the Seed Coating

Six mg. of potassium gibberellate as (Gibberellic acid, K Salt, Calbiochem, 20 percent inert ingredients) was dissolved in approximately 25 ml. of anhydrous methanol and quantitatively transferred to a 500 ml. round bottom flask containing 250 g. of polypropylene particles (Hercules Profax 6301) in a slurry of absolute methanol. The methanol was stripped off via rotary evaporation and the free-flowing treated polypropylene particles were transferred to a pan and air dried overnight.

The dried, treated polypropylene was used to coat lettuce seeds (Ferry Morse Calmar MT) according to the method described in Example 1. The coating was built up to a thickness of 1 to 3 mm. No significant difference in porosity characteristics was found between these treated coated seeds and the untreated coated seeds of Example 1.

When coated lettuce seeds having potassium gibberel-late-$A_3$ added to the coating were planted, the initial rate of germination was enhanced.

What is claimed is:

1. A coated seed comprising a seed bearing a coating which comprises a plurality of non-porous, hydrophobic, non-phytotoxic particles which are adhered to each other and to the seed by means of a hydrophilic binder which is present in an amount not exceeding 10 percent by weight of said coating, and wherein said coated seed has a porosity characteristic of at least 15 percent total porosity with at least 12 percent of the total pore volume being due to the presence of pores having a diameter between 2 and 100 microns.

2. A coated seed according to claim 1 wherein said coated seed has a porosity characteristic of at least 25 percent total porosity with at least 25 percent of the total pore volume being due to the presence of pores having a diameter between 2 and 100 microns.

3. A coated seed according to claim 2 wherein the particles comprise a synthetic polymeric material.

4. A coated seed according to claim 3 wherein the particles comprise polypropylene.

5. A coated seed according to claim 3 wherein the particles comprise polyethylene or polyester.

6. A coated seed according to claim 1 wherein the particles have a diameter between 50 and 900 microns.

7. A coated seed according to claim 6 wherein the particles have a diameter between 150 and 750 microns.

8. A coated seed according to claim 1 wherein the particles comprise silanized glass.

9. A coated seed according to claim 1 wherein the particles are fiber-shaped and their longest dimensions are up to 2500 microns.

10. A coated seed according to claim 1 wherein the binder is animal hide glue.

11. A coated seed according to claim 1 wherein the binder is polyvinyl alcohol.

12. A coated seed according to claim 1 wherein the binder is hydroxypropyl cellulose.

13. A coated seed according to claim 1 wherein the particles comprise polypropylene and the binder comprises animal hide glue.

14. A coated seed according to claim 1 wherein the coating thickness is 1 to 3 millimeters.

15. A coated seed according to claim 1 wherein growth regulators have been incorporated into said coating.

16. A coated seed according to claim 1 wherein the seed coated is lettuce.

17. A coated seed according to claim 1 wherein the seed coated is sugar beet.

18. A coated seed according to claim 1 wherein the seed coated is radish.

19. A coated seed according to claim 1 wherein the seed coated is onion.

20. A coated seed according to claim 1 wherein the seed coated is celery.

21. A coated seed according to claim 1 wherein the seed coated is cucumber.

22. A coated seed according to claim 1 wherein the seed coated is carrot.

23. A coated seed according to claim 1 wherein the seed coated is spinach.

24. A coated seed according to claim 1 wherein the seed coated is tomato.

25. A coated seed according to claim 1 wherein the seed coated is cabbage.

* * * * *

UNITED STATES PATENT OFFICE
CERTIFICATE OF CORRECTION

PATENT NO. : 3,905,152
DATED : September 16, 1975
INVENTOR(S) : JOHN C. LOPERFIDO It is certified that error appears in the above-identified patent and that said Letters Patent are hereby corrected as shown below:

Col. 4, line 31, change "It" to -- If --.

Col. 6, line 32, "at" not legible.

Col. 8, line 13, change "diameters" to -- diameter --.

Col. 9-10, bottom of page, line 3, Example 15, change "(Allied (J. T. 1221)" to -- (Allied Chemical 1221). --.

Col. 11, line 67, after naked insert -- sugar --.

Col. 12, line 7, change "silanized" to -- unsilanized --.

Col. 13, lines 10-11, change "gibber-el-late-$A_3$" to -- gibberellate-$A_3$ --.

Signed and Sealed this eighteenth Day of May 1976

[SEAL]

Attest:

RUTH C. MASON
Attesting Officer

C. MARSHALL DANN
Commissioner of Patents and Trademarks